Charles C. Cartia
William H. Shaw
INVENTORS

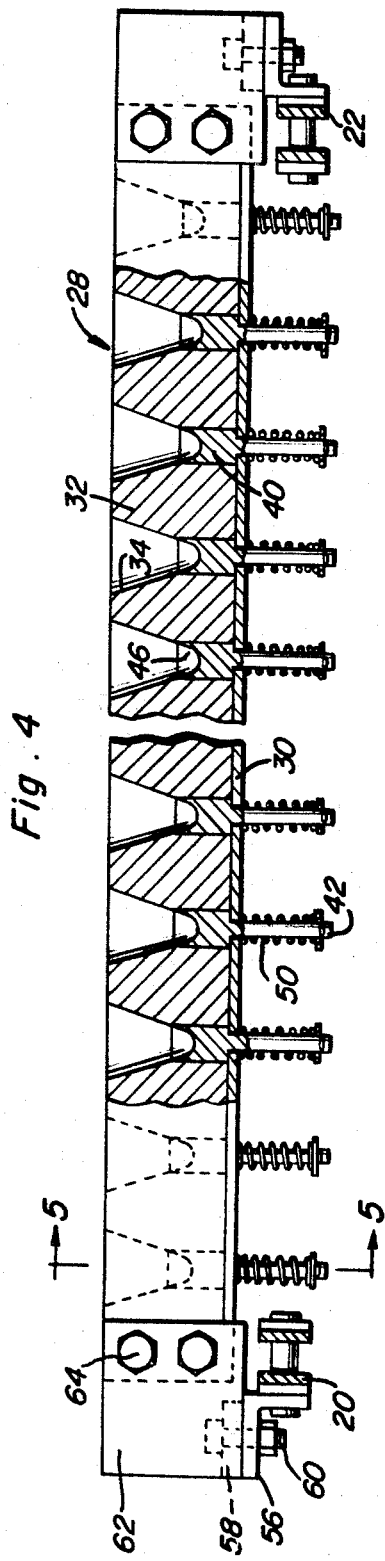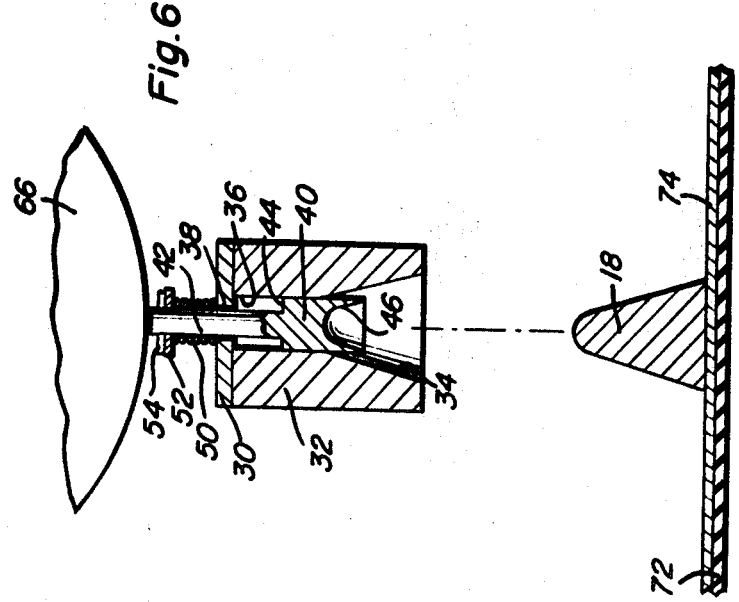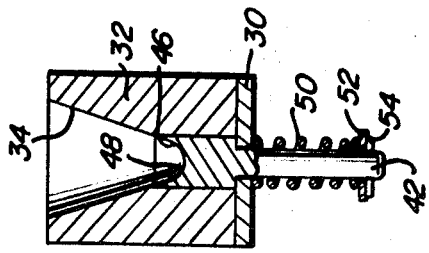

United States Patent Office 3,605,644
Patented Sept. 20, 1971

3,605,644
CHOCOLATE DROP MAKING MACHINE
Charles C. Cartia and William H. Shaw, Elizabeth, Pa.,
assignors to Thurman's Inc.
Filed Feb. 18, 1969, Ser. No. 800,132
Int. Cl. A23g 1/22
U.S. Cl. 107—8                                    2 Claims

ABSTRACT OF THE DISCLOSURE

An endless conveyor belt having a plurality of molds thereon for receiving a flowable and hardenable confection material from a supply hopper and dispensing mechanism with each mold having an ejector pin inserted into the bottom of the mold by an actuator for ejecting the hardened confection from the mold onto a conveyor for carrying the hardened confections to another station for coating with chocolate or the like.

---

The present invention generally relates to a chocolate drop making apparatus and more particularly, such an apparatus which is substantially automatic and continuous in operation.

In the making of chocolate drops, a manual method has been practiced in which trays having a plurality of molds therein are filled with flowable confection material and then vibrated to settle the confection material and then cooled to solidify the confection material after which the trays are inverted and the hardened confection material discharged from the trays by striking the trays with mallets or the like in order to loosen and remove the confections therefrom. As will be appreciated, such practice requires substantial manual labor and frequently produce a confection product that is not standard due to the possibility of breakage and damage to the confections during the removing operation.

In view of the objections and shortcomings of the manual practice, there has been developed automatic machinery for forming chocolate drops. One example of such a machine is found in Pat. No. 1,783,402, issued Dec. 2, 1930, which involves an endless conveyor having a plurality of molds thereon together with a mechanically actuated hammer for striking the bottoms of the inverted molds to remove confections therefrom. A subsequent advance in this art is illustrated in Pat. No. 1,840,-438, issued Jan. 12, 1932, in which the molds are mounted on a conveyor belt and are constructed of two hinged sections so that the molds, in effect, are split apart to discharge the confection therefrom.

While previously known and employed devices have increased the efficiency and reduced the cost of making chocolate drops, there are still certain problems existing in the industry and accordingly, it is an object of the present invention to provide a chocolate drop making apparatus which is completely automatic in operation and substantially continuous with the apparatus including a structure for positively removing the confections from the molds while the molds are retained in a one-piece condition thereby rendering the structure quite simple thus inherently reducing the initial cost thereof and also reducing the maintenance cost thereof thereby further increasing the efficiency of the chocolate drop making procedure.

Another object of the present invention is to provide a chocolate drop making apparatus which includes an endless conveyor structure having a plurality of molds mounted thereon receiving hardenable confection from a supply hopper and dispenser together with ejector mechanism in each mold actuated by a roller-type actuator or the like which will eject the hardened confection onto a conveyor which may convey the confections to an enrober which coats the confection with a coating of chocolate or other coating material with the details of the enrober forming no part of the present invention.

A further object of the present invention is to provide a chocolate drop making apparatus in accordance with the preceding objects in which the ejector is provided with an inner surface engaging the confection which conforms with and shapes and engages the apex of the generally conical chocolate drop so that a substantial portion of the peripheral apex of the confection will be engaged by the ejector pin to eliminate damage to the confection during ejection by the ejector pin.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a vertical sectional view, on an enlarged scale along the center of one group of molds;

FIG. 5 is a vertical sectional view on an enlarged scale, taken substantially along section line 5—5 of FIG. 4 illustrating further structural details of the mold and the ejector pin associated therewith; and FIG. 6 is a detailed sectional view of the mold when in inverted condition with the ejector pin being actuated for discharging the formed confection onto an underlying conveyor.

Figure 1:
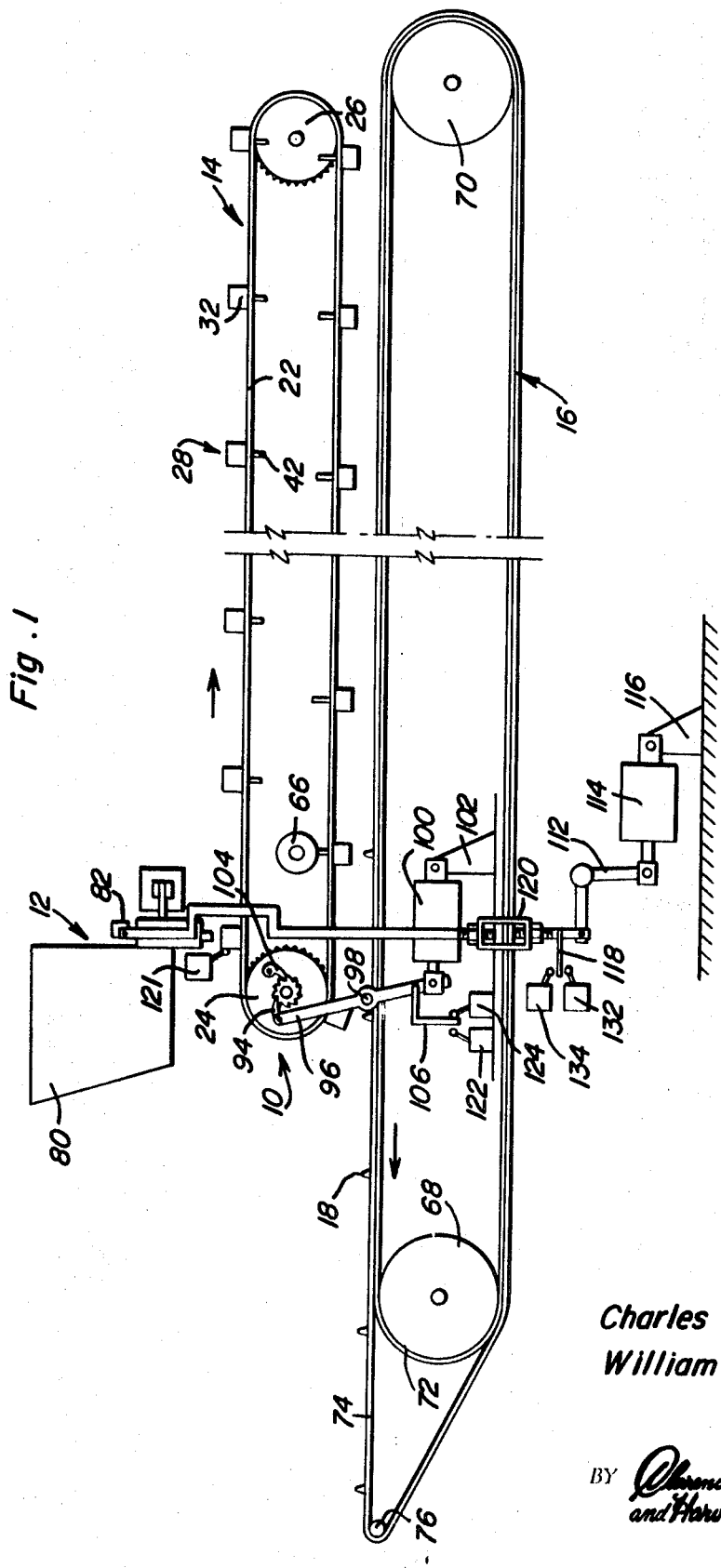
FIG. 1 is a side elevational view of the chocolate drop making apparatus of the invention with certain controls thereof illustrated schematically.
Figure 2:
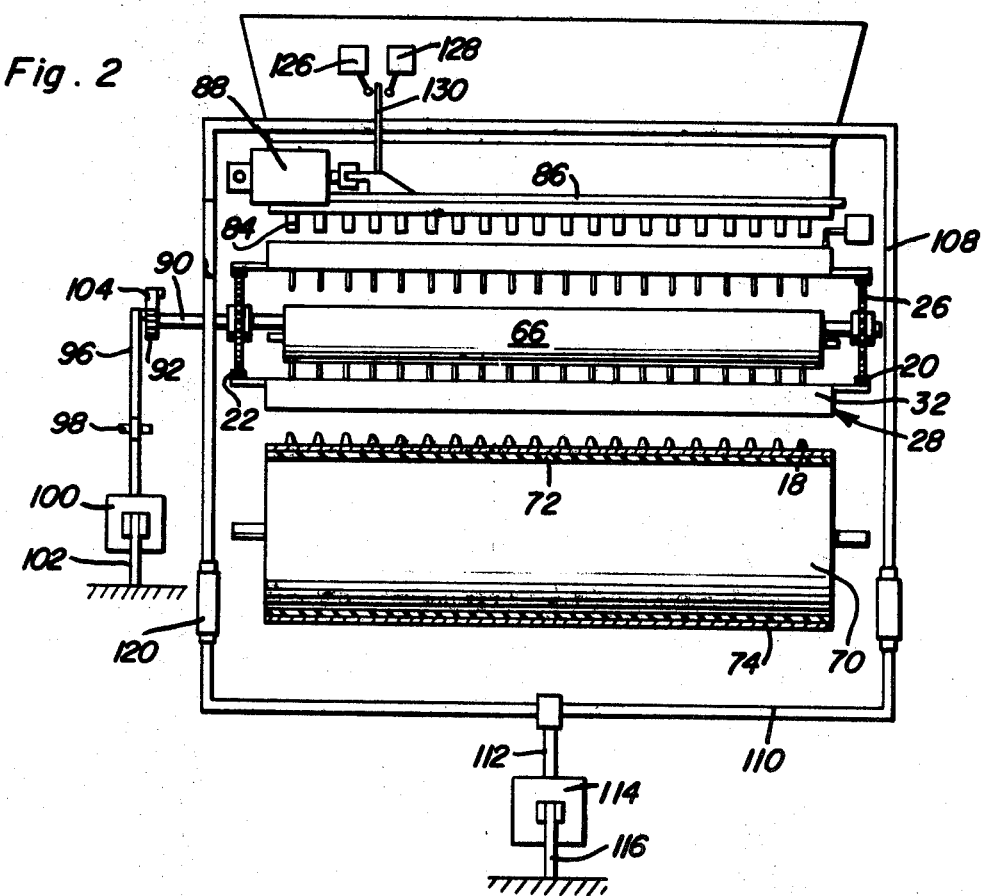
FIG. 2 is a vertical sectional view at the discharge end of the hopper and dispenser mechanism illustrating the relationship of the components of the apparatus.
Figure 3:
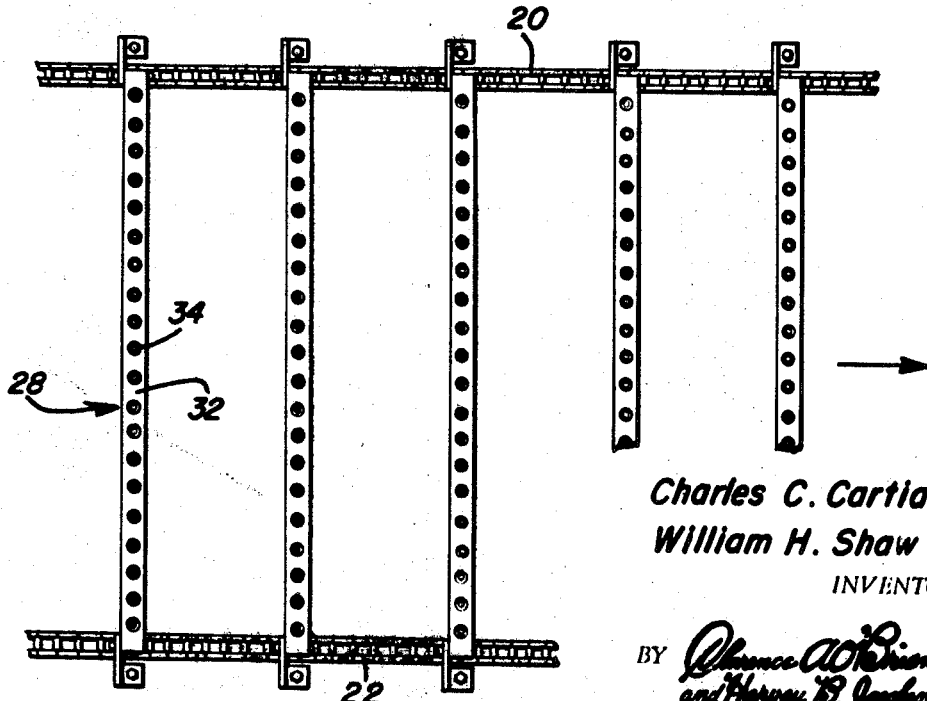
FIG. 3 is a fragmental enlarged plan view of the conveyor having the molds mounted thereon.

Referring now specifically to the drawings, the chocolate drop making apparatus of the present invention is generally designated by the numeral 10 and includes a supply hopper and dispensing mechanism generally designated by the numeral 12, a mold conveyor generally designated by the numeral 14 and a conveyor generally designated by the numeral 16 for receiving molded confections 18 from the mold conveyor 14. As illustrated in FIG. 6, the confections 18 are generally conical in configuration with a substantially flat bottom surface and an upwardly tapering peripheral wall terminating in a rounded apex at the upper end thereof and are constructed of a confection material normally forming the center of chocolate drops. From the conveyor 16, the confections 18 are conveyed to an enrober (not shown) where the confections 18 are coated with chocolate to form chocolate drops. It is pointed out that the confection may be coated with other materials to form other products as desired.

The mold conveyor 14 includes a pair of endless chains 20 and 22 which are entrained over end sprocket gears 24 and 26 which orient the chains 20 and 22 into two substantially elongated horizontal runs as illustrated in FIG. 1.

Extending between the conveyor chains 20 and 22 at longitudinally spaced points therealong is a plurality of mold supporting bars 28 generally in the form of an elongated relatively narrow metal strap 30 with an elongated bar 32 attached thereto and having the same width dimension. The bar 32 has a plurality of mold cavities 34 formed therein which taper in cross-sectional dimension inwardly from the outer surface of the bar towards the inner surface thereof. Communicating with the tapering cavity 34 is a cylindrical cavity or recess 36 which extends to the bottom of the bar and the top surface of the strap 36. The strap 36 has an opening 38 extending therethrough in communication with the recess 36 with the aperture 38 also being cylindrical but with a lesser diameter than the recess 36.

Slidably received within the recess 36 is an ejector pin 40 having a shank 42 slidably extending through the aperture 38. Both the pin 40 and the shank 42 are of cylindrical configuration with the pin 40 being of larger diameter than the shank 42 thus defining a shoulder 44 which will engage the inner surface of the strap 30 to limit the movement of the ejector pin 40 inwardly of the cavity 34.

The end of the ejector pin 40 facing the cavity 34 is also provided with a tapering cavity 46 which tapers in the same angle and as a continuation of the cavity 34 as illustrated in FIG. 5. The cavity 46 has a rounded inner end as at 48 which conforms with and shapes the apex of the confection 18 so that in the normal position of the ejector pin 40 when receiving the flowable and hardenable confection 18 is as illustrated in FIG. 5 wherein the combined cavity 34, 46 and 48 define the shape of the confection 18 to be formed.

For retaining the ejector pin 40 in its normal filling position, a coil compression spring 50 encircles the shank 42 outwardly of the strap 30 with one end thereof abutting against the surface of the strap 30 and the other end abutting against a retaining washer 52 on the shank 42. The washer 52 is releasably retained on the shank by a removable pin 54 extending through the shank 42 slightly inwardly from the free end thereof so that the spring 50 will normally retain the ejector pin 40 in its normal filling position but the spring 50 is capable of being compressed to the condition illustrated in FIG. 6 so that the ejector pin 40 may be moved outwardly in relation to the cavity 34 for ejecting the confection 18 from the cavity 34.

The mold bar 28 is supported from the chains 20 and 22 by right angular brackets 56 having one leg thereof attached to the side of a chain link or chain link pin and the other leg thereof attached to a horizontal plate 58 by a fastening bolt 60 or the like. The horizontal plate 58 is a part of a vertical bracket 62 which extends alongside of the end portions of the mold bar 28 and is detachably secured thereto by fastening bolts 64 or the like thus enabling easy removal of the mold bars 28 when desired for replacement, repair or the like thus enabling the shape, size and configuration of the cavities to be varied if desired to change the shape and characteristics of the output of the apparatus. By supporting the mold bars from the outer sides of the chains 20 and 22, the pins or at least the shanks 42 thereof may extend inwardly beyond the inner surface of the chains 20 and 22 so that the interior ends thereof may engage a discharge roller 66 which has the periphery thereof disposed in the path of movement of the inner ends of the shanks 42 of the pins 40 so that the ejector pins 40 may be depressed and inserted into the bottom portion of the cavity 34 for ejecting the confection 18. The discharge roller 66 is supported in any suitable manner so that it may rotate freely and, if desired, the roller 66 may be adjustably supported for varying the degree of depression of the shank 42 thereby varying the degree of insertion of the ejector pin 40 into the cavity 34.

As illustrated in FIG. 1, the mold cavities in the mold bars are filled with flowable and hardenable confection material which is maintained flowable due to its elevated temperature. The supply hopper and dispensing structure 12 is oriented adjacent the end of the conveyor 14 having the sprocket gears 24 associated therewith. The conveyor 14 is sufficiently long and is driven at a sufficiently slow rate to enable cooling of the confection during its conveyance between the sprocket gears 24 and the sprocket gears 26 so that as the mold bars 28 proceed around the sprocket gears 26 and become inverted, the confection 18 will be sufficiently hardened that it will not run out of the inverted molds. Then, during the return movement of the mold bars 28 toward the sprocket gears 24, the confection 18 will be additionally hardened and the confections are discharged from the mold cavities by the discharge roller 66 just prior to the mold bars 28 passing back around the end sprocket gears 24 thus assuring that the maximum distance and time is provided for the confections to harden and solidify due to their cooling by ambient air or by artificial cooling mechanisms if deemed necessary. By varying the length of the conveyor, adequate time may be provided for adequate hardening and solidifying of the confections.

The receiving conveyor 16 includes horizontally spaced and aligned end rollers 68 and 70 which receive an endless flexible conveyor belt 72 of canvas or other conventional conveyor belting with the conveyor belt 72 forming a backing for a food receiving belt 74 which actually receives the confections 18 or chocolate drop centers 18 and conveys them beyond the end roller 68 with the food conveyor belt 74 extending around the smaller roller 76 beyond the end roller 68 for the conveyor belt 72 and the discharge from the conveyor belt 74 is to the end roller or the like. The food conveyor belt 74 may be constructed of a flexible material that is easy to clean and which will not have a tendency to have the confections 18 become stuck thereto.

The conveyor belts 72 and 74 may be driven in any suitable manner at a relatively constant and continuous slow speed or they may be intermittently driven at the same speed as the conveyor 14 so that the confections 18 will be retained in transverse rows and in the same spaced relation as they are discharged from the mold cavities 34 to facilitate their passage through the enrober. The specific structure for supporting the conveyor rollers 68, 70 and 76 is not illustrated but may be of any suitable conventional construction with adjustments being provided for maintaining the tension thereof and this is also true of the conveyor belt 14.

The supply hopper and dispensing assembly 12 includes an elongated hopper 80 receiving the flowable and hardenable fondant from a source (not shown) with the hopper 80 being provided with a constant supply of fondant which is retained in a flowable condition by heaters, agitators or whatever else equipment necessary to retain the fondant in flowable condition. A bar pump 82 is provided across the lower end of the hopper 80 and communicated therewith with the bar pump including a plurality of nozzles 84 with each nozzle aligned with a mold cavity 34 for discharging fondant into the mold cavity when it is aligned therewith. For controlling discharge of the bar pump, a slide valve structure 86 is provided operated by a fluid pressure operated piston and cylinder assembly 88 such as an air cylinder that is connected to the slide 86 to operate it for selectively opening and closing the nozzles 84 in a predetermined sequence for a predetermined time so that sufficient fondant or confection material will be discharged into the cavities 34 to substantially fill the cavities 34 to a level condition with the upper edge thereof.

For driving the conveyor 14 intermittently, the sprocket gears 24 carried by shaft 90 are driven by a ratchet gear 92 on the shaft 90. The ratchet gear 92 is engaged by a pawl 94 on one end of a lever 96 pivotally supported by a shaft or pin 98 adjacent its center with the opposite end thereof pivotally attached to the output of a fluid pressure actuated piston and cylinder assembly 100 such as an air cylinder that is pivotally supported from an anchor bracket 102 so that as the air cylinder 100 is actuated, the lever 96 will pivot about pivot point 98 and the pawl 94 will turn the ratchet gear 92 and the shaft 90 as well as the sprocket gears 24 and the conveyor chains 20 and 22 a predetermined increment of movement. A gravity actuated pawl 104 also engages the ratchet gear 92 to prevent reverse rotation thereof during the return movement of the pawl 94 as the piston and cylinder assembly 100 are contracted. Also attached to the lever 96 is an actuating arm 106.

For operating the bar pump 82, the elongated bar is provided with a generally rectangular actuating frame 108 which includes a bottom member 110 extending under the conveyor 16 and connected to one end of a bell crank 112 with the other end of the bell crank being connected with a fluid pressure operated piston and cylinder assembly 114 such as an air cylinder that has the opposite end thereof pivotally anchored to an anchor bracket 116 or the like. An actuating arm 118 is attached to the operating frame 108 and an adjustment turnbuckle 120 is provided in the actuating frame 108 to enable adjustment of the movement thereof to vary the quantity of fondant discharged by the bar pump for each reciprocal actuation thereof.

A limit switch 121 is provided with a feeler in the path of movement of the mold bars 28 and limit switches 122 and 124 are provided with feelers in the path of movement of the actuating arm 106 attached to the lever 96 and limit switches 126 and 128 are provided with their feelers in the path of movement of an upstanding actuating arm 130 on the slide valve 96 actuated by the air cylinder 88 and limit switches 132 and 134 are disposed in the path of movement of the actuating arm 118 attached to the bar pump actuating frame 108 to effectively control operation of the conveyor structures and pump structures in a timed manner so that when a mold bar 28 is oriented with the cavities 34 in alignment with the bar pump discharge nozzles, the bar pump will be actuated along with the slide valve for filling the cavities and then moving the mold cavities 34 in the direction of the arrows in FIG. 1 and bringing another set of mold cavities under the bar pump in a timed and automatic sequence.

The particular structure for adjustably supporting the various limit switches and their feeler arms is not disclosed inasmuch as this may be any convenient and conventional construction with the electrical association of the various switches and controls also being varied depending upon each individual installation employing conventional electrical techniques. Also, the mold body 32 may be constructed of various materials which will not have a tendency to have the fondant stick thereto. If desired, the mold cavities may be coated with well known plastic coatings or the like such as "Teflon." While the dimensional characteristics of the device may vary, it has been found that 20 molds in each mold body simultaneously producing 20 confections is workable with each mold cavity including approximately one and one half inches which includes one half of the space between adjacent cavities. Also, while the cavity itself may vary in dimension, it has been found that a one inch diameter at the mouth of the cavity is adequate with the combined cavities 34 and 46 having a depth of one and one quarter inches with the depth of the mold body 32 being one and three quarter inches. All of these structural features are variable depending upon the requirements of a particular installation. The essential features of the invention are the mold bars and their association with the conveyor chains to form the mold conveyor and the manner in which the molds are emptied by ejecting the hardened and solidified fondant or confection. This combined with the discharge conveyor belts and the mechanism for controlling the movement of the conveyors and discharge of the fondant and alignment of the cavities therewith in a timed sequence are, of course, necessary for efficient operation of the apparatus. The intermittent ratchet drive of the mold conveyor is synchronized with operation of the bar pump and slide valve associated therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A chocolate drop making apparatus comprising a mold conveyor means, dispenser means for flowable and hardenable fondant, a receiving conveyor means underlying the mold conveyor means and receiving hardened and solidified confections therefrom, said mold conveyor means including a plurality of mold cavities receiving fondant from the dispenser means, and means ejecting molded confections from the cavities on the mold conveying means by engaging with the molded confections, each of said mold cavities including a tapering cavity having a continuous one-piece peripheral wall, said means ejecting molded confections from the cavities including an ejection pin reciprocally mounted in alignment with the inner end of the cavity and moving axially into the cavity for ejecting the confection, said ejection pin including a tapering cavity defining a continuation of the tapering mold cavity and forming the innermost end portion of the mold cavity and forming and engaging the confection for molding the confection and ejecting it from the cavity when the pin is moved axially toward the open end of the cavity, and actuating means for contacting the ejector pins, said actuating means including a freely rotating roller engaging the ends of the ejector pins remote from the portion of the pins having the cavity therein and spring means engaged with the ejector pins for biasing them into a normal filling position with the cavity in the ejector pins forming a continuation of the mold cavity.

2. In a molding apparatus, a mold body having an inwardly tapering cavity therein defined by a continuous peripheral wall, an ejector pin extending axially into the inner end of said cavity and mounted for reciprocation in said mold body, said ejector pin adapted to directly engage a molded item in the mold cavity and eject it from the cavity, said ejector pin including a cavity in the end portion thereof disposed within the mold cavity and forming a continuation of the tapering cavity in the mold body to shape the molded item over a portion of the apex thereof sufficient to eject the molded item without damage thereto but insufficient to retain the molded item against the action of gravity when the molded item is ejected from the mold cavity.

References Cited

UNITED STATES PATENTS

| | | | |
|---|---|---|---|
| 1,783,402 | 12/1930 | Cahoon | 107—8 |
| 2,652,789 | 9/1953 | Peters et al. | 107—8.2 |
| 2,841,098 | 7/1958 | Spronken | 107—8.2 |

FOREIGN PATENTS

| | | | |
|---|---|---|---|
| 531,678 | 10/1956 | Canada | 107—8.2 |
| 648,488 | 8/1928 | France | 107—8.2 |
| 739,666 | 10/1943 | Germany | 107—8.4 |

HENRY S. JAUDON, Primary Examiner